United States Patent
Horiuchi et al.

(10) Patent No.: US 10,233,318 B2
(45) Date of Patent: Mar. 19, 2019

(54) POLYOLEFIN-BASED RESIN COMPOSITION, FILM, MEDICAL BAG, AND TUBE

(71) Applicant: Asahi Kasei Kabushiki Kaisha, Tokyo (JP)

(72) Inventors: Mika Horiuchi, Tokyo (JP); Noriko Yagi, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 81 days.

(21) Appl. No.: 15/323,278

(22) PCT Filed: Jun. 30, 2015

(86) PCT No.: PCT/JP2015/068800
§ 371 (c)(1),
(2) Date: Dec. 30, 2016

(87) PCT Pub. No.: WO2016/002764
PCT Pub. Date: Jan. 7, 2016

(65) Prior Publication Data
US 2017/0137618 A1    May 18, 2017

(30) Foreign Application Priority Data
Jul. 1, 2014  (JP) ................. 2014-136117

(51) Int. Cl.
C08L 53/02   (2006.01)
C08L 23/16   (2006.01)
C08L 23/02   (2006.01)
C08J 5/18    (2006.01)

(52) U.S. Cl.
CPC ............... C08L 23/16 (2013.01); C08J 5/18 (2013.01); C08L 23/02 (2013.01); C08L 53/02 (2013.01); *C08J 2323/16* (2013.01); *C08J 2353/02* (2013.01); *C08J 2423/16* (2013.01); *C08J 2453/02* (2013.01); *C08L 2203/02* (2013.01); *C08L 2203/16* (2013.01)

(58) Field of Classification Search
CPC ........ C08L 23/16; C08L 53/02; C08J 2323/16
See application file for complete search history.

(56) References Cited

U.S. PATENT DOCUMENTS 3,865,776 A * 2/1975 Gergen ................. C08L 53/025
 524/505
4,539,393 A * 9/1985 Tamura ...................... C08J 5/18
 528/183
6,455,635 B1   9/2002 Yonezawa et al.
2004/0091686 A1 * 5/2004 Okamoto ................ B32B 15/08
 428/209
2005/0107521 A1   5/2005 Sasagawa et al.
2007/0004830 A1   1/2007 Flood et al.
2010/0009158 A1 * 1/2010 Imaizumi .................. B29B 9/14
 428/222
2011/0217538 A1 * 9/2011 Miura ...................... B32B 27/32
 428/304.4
2011/0319837 A1  12/2011 Uehara et al.
2014/0045985 A1   2/2014 Nagasima et al.
2015/0344684 A1  12/2015 Kusanose et al.

FOREIGN PATENT DOCUMENTS

| | | |
|---|---|---|
| EP | 1580230 A2 | 9/2005 |
| JP | H06-172593 A | 6/1994 |
| JP | 2000-219783 A | 8/2000 |
| JP | 2003-238813 A | 8/2003 |
| JP | 2005-324347 A | 11/2005 |
| JP | 2007-526388 A | 9/2007 |
| JP | 2010-275383 A | 12/2010 |
| JP | 2012-246378 A | 12/2012 |
| JP | 2014-034625 A | 2/2014 |
| TW | 201412831 A | 4/2014 |
| WO | 2000/015681 A1 | 3/2000 |
| WO | 2010/104068 A1 | 9/2010 |
| WO | 2012/160869 A1 | 11/2012 |

OTHER PUBLICATIONS

International Search Report issued in corresponding International Patent Application No. PCT/JP2015/068800 dated Sep. 29, 2015.
Supplementary European Search Report issued in counterpart European Patent Application No. 15815571.3 dated Mar. 31, 2017.
International Preliminary Report on Patentability issued in corresponding International Patent Application No. PCT/JP2015/068800 dated Jan. 3, 2017.

* cited by examiner

*Primary Examiner* — Jeffrey C Mullis
(74) *Attorney, Agent, or Firm* — Morgan, Lewis & Bockius LLP

(57) ABSTRACT

A polyolefin-based resin composition comprising:
a polyolefin-based resin, and
a hydrogenated block copolymer having a polymer block A mainly containing a vinyl aromatic monomer unit and a polymer block B mainly containing a conjugated diene monomer unit, wherein
a mass ratio of the polyolefin-based resin/the hydrogenated block copolymer is 95 to 5 parts by mass/5 to 95 parts by mass,
a total vinyl aromatic monomer unit content in the hydrogenated block copolymer is 12 to 25 mass %,
a degree of hydrogenation of double bonds based on the conjugated diene monomer unit in the hydrogenated block copolymer is 90 mol % or more, and
a melt flow rate value is 7 to 26 g/10 min.

13 Claims, No Drawings

POLYOLEFIN-BASED RESIN COMPOSITION, FILM, MEDICAL BAG, AND TUBE

TECHNICAL FIELD

The present invention relates to a polyolefin-based resin composition, a film, a medical bag, and a tube.

BACKGROUND ART

Hydrogen-added (hydrogenated) block copolymers composed of a conjugated diene monomer and a vinyl aromatic monomer have, even without being vulcanized, elasticity comparable to vulcanized natural rubber and synthetic rubber at ordinary temperatures, have excellent weather resistance and heat resistance, and, moreover, have processability comparable to thermoplastic resins at high temperatures. Accordingly, such hydrogenated block copolymers are widely used for footwear, plastic modification, asphalt modification, viscous adhesives, home-use products, packaging materials of household electrical appliance and industrial components, toys, automobile parts, medical instruments, and the like.

Meanwhile, polypropylene-based resin compositions generally have excellent chemical resistance and mechanical properties, and are thus used in a broad range of fields such as packaging materials, miscellaneous articles, mechanical parts, automobile parts, and medical instruments. Moreover, polypropylene-based resin compositions are also used in the fields of sheet, film, tube, and the like, and for coating materials, connector materials, and the like of electric wires and cables for household electrical appliances, IT devices, etc. In these fields, there are demands for soft and transparent polypropylene-based resin compositions. With recent reduction in side of various devices, narrower electric wires and communication cables are used therefor and, accordingly, coating materials as well are becoming thinner. Consequently, there are also demands for polypropylene-based resin compositions having suitable flexibility and thin-wall molding processability from the viewpoint of shape retention.

In order to make polypropylene-based resin compositions soft and transparent, a method is used in which an elastomer such as an olefin elastomer is added to a polypropylene-based resin composition.

Moreover, for example, Patent Literature 1, in order to enhance the flowability and the transparency of a polypropylene-based resin composition, discloses a hydrogenated block copolymer having a specific melt flow rate value (MFR), comprising a specific amount of styrene, and having a specific amount of a hydrogenated polybutadiene block at a terminal, i.e., discloses a composition comprising a styrene elastomer and a polyolefin-based resin.

Furthermore, for example, Patent Literature 2, in order to impart high flowability and molding processability to a polyolefin-based resin composition, discloses a composition comprising a hydrogenated block copolymer obtained by hydrogenating a copolymer having a block composed of a vinyl aromatic monomer unit and a block in which the amount of vinyl bond of a conjugated diene monomer is 65 mol % or more and 85 mol % or less.

LIST OF PRIOR ART DOCUMENTS

Patent Literature

Patent Literature 1: Japanese Patent Laid-Open No. 2014-34625

Patent Literature 2: Japanese Patent Laid-Open No. 2007-526388

SUMMARY OF INVENTION

Technical Problems to be Solved by the Invention

However for example, when a polypropylene-based resin composition comprises an olefin-based elastomer or the like, the softness of the polypropylene-based resin composition is enhanced, but there is a problem in that sufficient dispersibility and transparency characteristics are not obtained in some cases.

Moreover, the composition disclosed in Patent Literature 1 in which a polyolefin-based resin and a styrene elastomer are used has room for improvement in the balance of softness, dispersibility, and transparency.

Furthermore, the polyolefin-based resin composition disclosed in Patent Literature 2 has room for improvement in the balance of molding processability and flexibility exerted when added to styrene elastomers.

Therefore, the present invention has been conceived in view of the above-described problems of conventional art, and an object of the present invention is to provide a polyolefin-based resin composition having an excellent balance of flexibility, thin-wall molding processability, dispersibility, mechanical properties, and transparency, as well as a film, a medical bag, and a tube.

Solution to Problem

As a result of having conducted diligent research to solve the above problems, the inventors found that a polyolefin-based resin composition comprising a specific polyolefin-based resin and a specific hydrogenated block copolymer in a specific ratio as well as a film, a medical bag, and a tube that comprise the polyolefin-based resin composition effectively solve the above problems, and accomplished the present invention.

That is to say, the present invention is as set forth below.

[1]

A polyolefin-based resin composition comprising:
a polyolefin-based resin, and
a hydrogenated block copolymer having a polymer block A mainly comprising a vinyl aromatic monomer unit and a polymer block B mainly comprising a conjugated diene monomer unit, wherein
a mass ratio of the polyolefin-based resin/the hydrogenated block copolymer is 95 to 5 parts by mass/5 to 95 parts by mass,
a total vinyl aromatic monomer unit content in the hydrogenated block copolymer is 12 to 25 mass %,
a degree of hydrogenation of double bonds based on the conjugated diene monomer unit in the hydrogenated block copolymer is 90 mol % or more, and
a melt flow rate value is 7 to 26 g/10 min.

[2]

The polyolefin-based resin composition according to the above [1], wherein
the hydrogenated block copolymer has a melt flow rate value of 10 to 30 g/10 min, and
the polyolefin-based resin has a melt flow rate value of 5 to 20 g/10 min.

[3]

The polyolefin-based resin composition according to the above [1] or [2], wherein a difference between the melt flow rate value of the polyolefin-based resin and the melt flow rate value of the hydrogenated block copolymer is 5 to 15 g/10 min.

[4]
The polyolefin-based resin composition according to any one of the above [1] to [3], wherein a ratio of elastic modulus in an MD direction to elastic modulus in a TD direction (elastic modulus in MD direction/elastic modulus in TD direction) is 0.85 to 1.2 when the polyolefin-based resin composition is formed into a film having a thickness of 0.25 mm.

[5]
The polyolefin-based resin composition according to any one of the above [1] to [4], wherein a mass ratio of the polyolefin-based resin to the hydrogenated block copolymer (the polyolefin-based resin/the hydrogenated block copolymer) is 50 to 10 parts by mass/50 to 90 parts by mass.

[6]
The polyolefin-based resin composition according to any one of the above [1] to [5], wherein a sum of an amount of 1,2-bond and an amount of 3,4-bond before hydrogenation of the hydrogenated block copolymer is 65 to 90 mol %.

[7]
The polyolefin-based resin composition according to any one of the above [1] to [6], wherein
the hydrogenated block copolymer comprises at least two polymer blocks A and at least two polymer blocks B,
at least one polymer block B is present at a terminal of the hydrogenated block copolymer, and
a content of the polymer block B present at a terminal is 0.5 to 9 mass % of the hydrogenated block copolymer.

[8]
The polyolefin-based resin composition according to any one of the above [1] to [7], wherein the polyolefin-based resin is a polypropylene-based resin.

[9]
The polyolefin-based resin composition according to the above [8], wherein the polypropylene-based resin is a propylene homopolymer and/or a block copolymer or random copolymer of propylene and a $C_{2-20}$ α-olefin (except for propylene).

[10]
The polyolefin-based resin composition according to the above [8], wherein
the polypropylene-based resin is a block copolymer or random copolymer of propylene and a $C_{2-20}$ α-olefin (except for propylene), and
a content of the $C_{2-20}$ α-olefin (except for propylene) contained in the polyolefin-based resin is 0.3 to 10 mass % of the polyolefin-based resin.

[11]
A film comprising the polyolefin-based resin composition according to any one of the above [1] to [10].

[12]
The film according to the above [11], wherein a ratio of elastic modulus in an MD direction to elastic modulus in a TD direction (elastic modulus in MD direction/elastic modulus in TD direction) is 0.85 to 1.2.

[13]
A medical bag comprising the film according to the above [11] or [12].

[14]
A tube comprising the polyolefin-based resin composition according to any one of the above [1] to [10].

Advantageous Effects of Invention

According to the present invention, a polyolefin-based resin composition having an excellent balance of flexibility, thin-wall molding processability, dispersibility, mechanical properties, and transparency, as well as a film, a medical bag, and a tube can be obtained.

DESCRIPTION OF EMBODIMENTS

Below, an embodiment for carrying out the present invention (hereinafter simply referred to as "the present embodiment") will now be described in detail. The present invention is not limited to the following embodiment, and can be carried out after making various modifications within the scope of the present invention.

Herein, each monomer unit constituting a polymer is named after the monomer from which the monomer unit is derived. For example, the "vinyl aromatic monomer unit" means a constitutional unit of a polymer produced as a result of polymerizing a monomer vinyl aromatic compound, and has a molecular structure in which two carbon atoms of a substituted ethylene group derived from a substituted vinyl group serve as bonding sites. Moreover, the "conjugated diene monomer unit" means a constitutional unit of a polymer produced as a result of polymerizing a monomer conjugated diene, and has a molecular structure in which two carbon atoms of an olefin derived from the conjugated diene monomer serve as bonding sites.

[Polyolefin-based Resin Composition]

The polyolefin-based resin composition of the present embodiment is a polyolefin-based resin composition comprising:
a polyolefin-based resin, and
a hydrogenated block copolymer comprising a polymer block A mainly comprising a vinyl aromatic monomer unit and a polymer block B mainly comprising a conjugated diene monomer unit, wherein
a mass ratio of the polyolefin-based resin/the hydrogenated block copolymer is 95 to 5 parts by mass/5 to 95 parts by mass,
a total vinyl aromatic monomer unit content in the hydrogenated block copolymer is 12 to 25 mass %,
a degree of hydrogenation of double bonds based on the conjugated diene monomer unit in the hydrogenated block copolymer is 90 mol % or more, and
a melt flow rate value is 7 to 26 g/10 min.

Having the above configuration, the polyolefin-based resin composition of the present embodiment has an excellent balance of flexibility, thin-wall molding processability, dispersibility, mechanical properties, and transparency.

(Hydrogenated Block Copolymer)

The polyolefin-based resin composition of the present embodiment comprises a hydrogen-added block copolymer (hereinafter also referred to as a hydrogenated block copolymer).

The hydrogenated block copolymer is obtained by hydrogenating a block copolymer comprising a polymer block A mainly comprising a vinyl aromatic monomer unit and a polymer block B mainly comprising a conjugated diene monomer unit (herein, a conjugated diene monomer unit that is saturated by hydrogenation is also referred to as a conjugated diene monomer unit).

The total vinyl aromatic monomer unit content in the hydrogenated block copolymer is 12 to 25 mass %, and the degree of hydrogenation of double bonds based on the conjugated diene monomer unit in the hydrogenated block copolymer is 90 mol % or more.

<Polymer Block A>

As described above, the polymer block A mainly comprises a vinyl aromatic monomer unit.

Examples of the vinyl aromatic monomer include, but are not limited to, styrene, α-methylstyrene, p-methylstyrene, divinylbenzene, 1,1-diphenylethylene, N,N-dimethyl-p-aminoethylstyrene, and N,N-diethyl-p-aminoethylstyrene.

Among these, it is preferable that the polymer block A comprises a styrene unit.

Only one vinyl aromatic monomer may be used singly, or two or more may be used.

The phrase "mainly comprising" as used herein means that a predetermined monomer unit is contained in an amount of 60 mass % or more, preferably 80 mass % or more, more preferably 90 mass % or more, and even more preferably 95 mass % or more (the same applies below).
<Polymer Block B>

As described above, the polymer block B mainly comprises a conjugated diene monomer unit.

Conjugated diene monomers include diolefins having a pair of conjugated double bonds. Examples of such conjugated diene monomers include, but are not limited to, butadiene such as 1,3-butadiene, 2-methyl-1,3-butadiene (isoprene), 2,3-dimethyl-1,3-butadiene, 1,3-pentadiene, 2-methyl-1,3-pentadiene, and 1,3-hexadiene.

Among these, it is preferable that the polymer block B comprises a butadiene unit such as 1,3-butadiene.

Only one conjugated diene monomer may be used singly, or two or more may be used.

From the viewpoint of the producibility of the hydrogenated block copolymer and from the viewpoint of the flexibility, dispersibility, mechanical properties, and transparency of the polyolefin-based resin composition of the present embodiment, the total vinyl aromatic monomer unit content in the hydrogenated block copolymer is 12 to 25 mass %, preferably 12 to 20 mass %, and more preferably 15 to 20 mass %. From the same viewpoints as above, the conjugated diene monomer unit content in the hydrogenated block copolymer is preferably 75 to 88 mass %, more preferably 80 to 88 mass %, and even more preferably 80 to 85 mass %.

These contents can be controlled by adjusting the ratio of raw materials used for polymerization.

The microstructure (the ratio of cis, trans, and vinyl) of the conjugated diene monomer portion in the hydrogenated block copolymer can be adjusted as desired by using a polar compound and the like which will be described below.

From the viewpoint of the flexibility, dispersibility, and transparency of the polyolefin-based resin composition of the present embodiment, the sum of the amount of 1,2-bond and the amount of 3,4-bond in the conjugated diene monomer before hydrogenation of the hydrogenated block copolymer is preferably in a range of 65 to 90 mol %, more preferably in a range of 68 mol % to 90 mol %, and even more preferably 72 mol % to 88 mol %. The sum of the amount of 1,2-bond and the amount of 3,4-bond can be determined by using a nuclear magnetic resonator (NMR), and, specifically, can be determined by the method described in the Examples below.

The sum of the amount of 1,2-bond and the amount of 3,4-bond before hydrogenation can be controlled to the above numerical range by using a polar compound or the like.

A preferable hydrogenated block copolymer comprises at least two polymer blocks A and at least one polymer block B, and examples thereof include, but are not particularly limited to, those having structures as represented by the following formulae.

A-B1-A

A-B1-A-B2

A-(B1-A)$_n$-B2

B2-A-(B1-A)$_n$-B2

(A-B1)$_n$-X

In the above formulae, A represents a polymer block mainly comprising a vinyl aromatic monomer unit, and B1 and B2 are polymer blocks mainly comprising a hydrogenated conjugated diene monomer unit.

It is not necessarily required that the boundary of the blocks is clearly distinguishable.

Moreover, n represents the number of times the parenthetical components repeat and is an integer or 1 or greater and preferably an integer of 1 to 5. X represents a coupling agent residue or a polyfunctional initiator residue.

When there are two or more polymer blocks A, the mass of each polymer block A may be the same or different.

The masses of polymer block B1 and polymer block B2 may be the same or different. When there are a plurality of polymer blocks B1 and B2, the masses may be the same or different.

In particular, a preferable hydrogenated block copolymer comprises at least two polymer blocks A and at least two polymer blocks B, wherein at least one polymer block B is present at a terminal of the hydrogenated block copolymer, and the content of the polymer block B present at a terminal is 0.5 to 9 mass % of the hydrogenated block copolymer.

That is to say, in the above formulae, a structure in which B2 accounts for 0.5 to 9 mass % of the hydrogenated block copolymer is preferable.

The content of the polymer block B at a terminal is more preferably 1 to 7 mass % and even more preferably 2 to 6 mass %.

Such a hydrogenated block copolymer is likely to result in reduced mutual blocking of pellets of the polyolefin-based resin composition of the present embodiment, excellent producibility, and a better balance of the flexibility, stress whitening characteristics, mechanical properties, and transparency of the polyolefin-based resin composition.

Among these, preferable is a hydrogenated block copolymer having a four-part structure represented by the polymer block A-the polymer block B (B1)-the polymer block A-the polymer block B (B2), wherein the B1 content is higher than the B2 content by 50 mass % or more in the hydrogenated block copolymer.

Such a hydrogenated block copolymer is likely to result in a better balance of the flexibility and the mechanical properties of the polyolefin-based resin composition of the present embodiment.

The weight average molecular weight of the hydrogenated block copolymer is preferably 40,000 to 200,000, more preferably 50,000 to 170,000, and even more preferably 60,000 to 150,000.

The molecular weight distribution of a single peak measured by gel permeation chromatography (GPC) on the hydrogenated block copolymer is preferably 1.2 or smaller, more preferably 1.15 or smaller, even more preferably 1.1 or smaller, and yet more preferably 1.08 or smaller. Moreover, it is preferably 1 or larger.

As will be described in the Examples below, the weight average molecular weight of the hydrogenated block copolymer is a weight average molecular weight determined from the molecular weights of peaks of a chromatogram obtained by GPC measurement based on a calibration curve determined from measurement on commercially available standard polystyrene (generated using the peak molecular weight of standard polystyrene).

The number average molecular weight of the hydrogenated block copolymer can also be determined from GPC measurement in the same manner, and the molecular weight distribution can be determined from the ratio of the weight average molecular weight to the number average molecular weight.

<Melt Flow Rate>

From the viewpoint of the productivity, molding processability, and mechanical properties of the hydrogenated block copolymer, the melt flow rate (ASTM D1238: 230° C., 2.16 kg load) of the hydrogenated block copolymer is preferably 10 to 30 (measurement unit: g/10 min), more preferably 11 to 28, even more preferably 12 to 26, yet more preferably 13 to 25, further more preferably 16 to 24, and particularly preferably 18 to 21.

The melt flow rate can be controlled by the molecular weight, the vinyl aromatic monomer unit content, the amount of vinyl bond of a conjugated diene part, the degree of hydrogenation, the content of the polymer block B at a terminal, the frequency at which A-B repeats (the frequency at which the polymer block A and the polymer block B repeat), the ratio of the amounts of two polymer blocks A, the number of polymer blocks B at a terminal, and the like.

The melt flow rate can be measured by the method described in the Examples below.

<Production Method of Block Copolymer>

Although the production method is not limited to the following, the block copolymer before the hydrogenation of the above-described hydrogenated block copolymer can be obtained by, for example, living anionic polymerization using a lithium initiator in a hydrocarbon solvent.

Examples of the hydrocarbon solvent include, but are not limited to, aliphatic hydrocarbons such as n-butane, isobutane, n-pentane, n-hexane, n-heptane, and n-octane; alicyclic hydrocarbons such as cyclohexane, cycloheptane, and methyl cycloheptane; and aromatic hydrocarbons such as benzene, toluene, xylene, and ethylbenzene.

Examples of the lithium initiator include, but are not limited to, aliphatic and aromatic hydrocarbon lithium compounds having 1 to 20 carbon atoms.

Such lithium compounds encompass compounds containing one lithium atom per molecule as well as dilithium compounds, trilithium compounds, and tetralithium compounds containing a plurality of lithium atoms per molecule. Specific examples thereof include, but are not limited to, n-propyllithium, n-butyllithium, sec-butyllithium, tert-butyllithium, n-pentyllithium, n-hexyllithium, benzyllithium, phenyllithium, tolyllithium, a reaction product of diisopropenylbenzene and sec-butyllithium, and a reaction product of divinylbenzene, sec-butyllithium and a small amount of 1,3-butadiene. Among these, n-butyllithium and sec-butyllithium are preferable from the viewpoint of polymerization activity.

Although the amount of using the lithium initiator varies depending on the molecular weight of the intended block copolymer, the lithium initiator is generally usable in an amount of 0.01 to 0.5 phm (parts by mass based on 100 parts by mass of monomer). The amount of using the lithium initiator is preferably 0.03 to 0.3 phm and more preferably 0.05 to 0.15 phm.

In the present embodiment, when a conjugated diene monomer and a vinyl aromatic monomer are subjected to block copolymerization using a lithium initiator as a polymerization initiator, a tertiary amine compound can be added as a polar compound.

Examples of the tertiary amine compound include, but are not limited to, compounds represented by the following formula.

R1R2R3N (In the formula, R1, R2, and R3 each represent a $C_{1-20}$ hydrocarbon group or hydrocarbon group having a tertiary amino group.)

Examples of such compounds include, but are not limited to, trimethylamine, triethylamine, tributylamine, N,N-dimethylaniline, N-ethylpiperidine, N-methylpyrrolidine, N,N,N',N'-tetramethylethylenediamine, N,N,N',N'-tetraethylethylenediamine, 1,2-dipiperidinoethane, trimethylaminoethylpiperazine, N,N,N',N'',N'''-pentamethylethylenetriamine, and N,N'-dioctyl-p-phenylenediamine.

Among these, N,N,N',N'-tetramethylethylenediamine is preferable.

The tertiary amine compound is used to increase the amount of vinyl bond of the polymer block B mainly containing a conjugated diene monomer unit. The amount of using the tertiary amine compound can be adjusted in light of the amount of vinyl bond of the intended conjugated diene part (the sum of the amount of 1,2-bond and the amount of 3,4-bond).

The amount of vinyl bond of the conjugated diene block portion of the block copolymer is preferably 65 to 90 mol %, and the amount of using the tertiary amine compound is, based on the lithium initiator, preferably 0.1 to 4 (mol/Li) and more preferably 0.2 to 3 (mol/Li).

Sodium alkoxide may be concomitantly present when a vinyl aromatic monomer and a conjugated diene monomer are copolymerized in the production process of a block copolymer.

Examples of the sodium alkoxide to be used include, but are not limited to, compounds represented by the following formula. In particular, sodium alkoxides having a $C_{3-6}$ alkyl group are preferable, and sodium t-butoxide and sodium t-pentoxide are more preferable.

NaOR (In the formula, R is a $C_{2-12}$ alkyl group.)

The amount of using the sodium alkoxide is preferably 0.01 or more and less than 0.1 (molar ratio), more preferably 0.01 or more and less than 0.08 (molar ratio), even more preferably 0.03 or more and less than 0.08 (molar ratio), and yet more preferably 0.04 or more and less than 0.06 (molar ratio), based on the tertiary amine compound.

When the amount of using the sodium alkoxide is within this range, a block copolymer is likely to be obtained at a high production rate, which has a polymer block B mainly comprising a conjugated diene monomer unit with a large amount of vinyl bond and a polymer block A mainly comprising a vinyl aromatic monomer unit with a narrow molecular weight distribution, which has a narrow molecular weight distribution, and which has high strength.

The method for subjecting a conjugated diene monomer and a vinyl aromatic monomer to block copolymerization using a lithium initiator as a polymerization initiator is not particularly limited, and it may be batch polymerization, may be continuous polymerization, or may be a combination thereof.

In particular, a batch polymerization method is preferable for obtaining a block copolymer having a narrow molecular weight distribution and high strength.

Although the polymerization temperature of the block copolymer is not particularly limited, it is generally 0° C. to 150° C., preferably 30° C. to 120° C., and more preferably 40° C. to 100° C.

Although the time necessary for polymerization varies depending on the conditions, it is usually within 24 hours and suitably 0.1 to 10 hours.

The atmosphere of the polymerization system is preferably an atmosphere of inert gas such as nitrogen gas.

The polymerization pressure is not particularly limited as long as it is within a pressure range sufficient for maintaining monomers and solvents in a liquid phase at the above polymerization temperature range.

Furthermore, care should be taken not to allow impurities such as water, oxygen, and carbon dioxide that inactivate the initiator and the living polymer to enter the polymerization system.

It is preferable that the block copolymer is obtained by successive polymerization.

Herein, successive polymerization means polymerizing the polymer block A and the polymer block B in a successive manner, and, for example, in the case of the above living anionic polymerization, a vinyl aromatic monomer is polymerized as a first step, a conjugated diene monomer is polymerized as a second step, then a vinyl aromatic monomer is polymerized as a third step, and, further, a conjugated diene monomer is polymerized as a fourth step. Accordingly, a block copolymer is likely to be obtained in a highly reproducible, more economical manner.

As for the hydrogenated block copolymer contained in the polyolefin-based resin composition of the present embodiment, an addition reaction can be performed to add a modifying agent that generates a functional-group-containing atomic group to the living terminal of the block copolymer obtained by a method as described above.

Examples of the functional-group-containing atomic group include, but are not limited to, atomic groups containing at least one functional group selected from the group consisting of a hydroxyl group, a carbonyl group, a thiocarbonyl group, an acid halide group, an acid anhydride group, a carboxyl group, a thiocarboxylic acid group, an aldehyde group, a thioaldehyde group, a carboxylic acid ester group, an amide group, a sulfonic acid group, a sulfonic acid ester group, a phosphoric acid group, a phosphoric acid ester group, an amino group, an imino group, a nitrile group, a pyridyl group, a quinoline group, an epoxy group, a thioepoxy group, a sulfide group, an isocyanate group, an isothiocyanate group, a silicon halide group, a silanol group, an alkoxysilicon group, a tin halide group, an alkoxytin group, and a phenyltin group.

Examples of the modifying agent having a functional-group-containing atomic group include, but are not limited to, tetraglycidylmetaxylenediamine, tetraglycidyl-1,3-bisaminomethylcyclohexane, ε-caprolactone, δ-valerolactone, 4-methoxybenzophenone, γ-glycidoxyethyltrimethoxysilane, γ-glycidoxypropyltrimethoxysilane, γ-glycidoxypropydimethylphenoxysilane, bis(γ-glycidoxypropyl)methylpropoxysilane, 1,3-dimethyl-2-imidazolidinone, 1,3-diethyl-2-imidazolidinone, N,N'-dimethylpropylene urea, and N-methylpyrrolidone.

The addition reaction temperature of the modifying agent is preferably 0 to 150° C. and more preferably 20 to 120° C.

Although the time required for the modification reaction varies depending on other conditions, it is preferably within 24 hours and more preferably 0.1 to 10 hours.

<Degree of Hydrogenation>

In the hydrogenated block copolymer contained in the polyolefin-based resin composition of the present embodiment, at least 90 mol % of the olefinic unsaturated double bonds of the conjugated diene monomer unit in the block copolymer obtained above is hydrogenated.

From the viewpoint of the weather resistance, mechanical strength, flexibility, stress whitening characteristics, and transparency of the hydrogenated block copolymer and the polyolefin-based resin composition of the present embodiment, the degree of hydrogenation is preferably 93 mol % or more and more preferably 95 mol % or more.

The amount of vinyl bond based on the conjugated diene monomer before the hydrogenation of the hydrogenated block copolymer and the degree of hydrogenation of the hydrogenated block copolymer can be determined using a nuclear magnetic resonator (NMR).

The hydrogenated block copolymer contained in the polyolefin-based resin composition of the present embodiment is obtained by performing hydrogenation treatment using a hydrogenation catalyst on a solution of a block copolymer obtained as described above.

Examples of the hydrogenation catalyst include, but are not limited to, a titanocene compound, a reducing organometallic compound, and a mixture of a titanocene compound and a reducing organometallic compound.

Usable as a titanocene compound is, but not limited to, a compound described in Japanese Patent Laid-Open No. 8-109219. Specific examples thereof include, but are not limited to, compounds having at least one ligand with a (substituted) cyclopentadienyl skeleton, such as bis(cyclopentadienyl)titanium dichloride and mono(pendamethylcyclopentadienyl)titanium trichloride, an indenyl skeleton, and a fluorenyl skeleton. Examples of the reducing organometallic compound include, but are not limited to, organoalkali metal compounds such as organolithium, organomagnesium compounds, organoaluminum compounds, organoboron compounds, and organozinc compounds.

The hydrogenation reaction is generally performed within a temperature range of 0 to 200° C. and more preferably 30 to 150° C.

The pressure of hydrogen used in the hydrogenation reaction is generally 0.1 to 15 MPa, preferably 0.2 to 10 MPa, and more preferably 0.3 to 5 MPa.

The hydrogenation reaction time is usually 3 minutes to 10 hours and preferably 10 minutes to 5 hours.

The hydrogenation reaction can be performed through any of a batch process, a continuous process, and a combination of these.

As for a solution of the hydrogenated block copolymer obtained as above, a catalyst residue is removed as necessary, further a solvent is separated from the solution, and thereby the hydrogenated block copolymer is obtained.

Examples of methods for separating the solvent include, but are not limited to, a method in which a polar solvent such as acetone or alcohol, which is a poor solvent for the hydrogenated block copolymer, is added to a solution of the hydrogenated block copolymer to recover the hydrogenated block copolymer as precipitates; a method in which a solution is introduced into boiling water under stirring to remove the solvent by steam stripping and recover the hydrogenated block copolymer; and a method in which a solution of the hydrogenated block copolymer is directly heated to distill off the solvent.

Various stabilizers such as phenolic stabilizers, phosphorous stabilizers, sulfuric stabilizers, and amine stabilizers can be added to the hydrogenated block copolymer.

Although the phenolic stabilizers are not particularly limited, specifically a hindered phenol compound or the like is suitably used.

Specific examples of the phosphorous stabilizers include, but are not particularly limited to, phosphoric acids, phosphorous acid esters, phosphinic acid esters, phosphoric acid esters, and phosphonic acid esters.

Specific examples of the sulfuric stabilizers include, but are not particularly limited to, pentaerythrityl tetrakis(3-laurylthiopropionate), dilauryl 3,3'-thiodipropionate, dimyristyl 3,3'-thiodipropionate, distearyl 3,3'-thiodipropionate, and mixtures of these.

Examples of the amine compounds include, but are not limited to, hindered amine compounds.

<Hydrogenated Block Copolymer Pellets>

When the hydrogenated block copolymer is formed into pellets, the hydrogenated block copolymer may be blended with an anti-blocking agent for the purpose of pellet blocking.

When the hydrogenated block copolymer is formed into pellets, it is preferable to add 0.1 to 1.5 parts by mass of a resin polymer powder having an average particle diameter of 1 to 15 μm as an anti-blocking agent to 100 parts by mass of the hydrogenated block copolymer.

(Polyolefin-based Resin)

The polyolefin-based resin composition of the present embodiment comprises the above-described hydrogenated block copolymer and a polyolefin-based resin.

Examples of the polyolefin-based resin include, but are not limited to, a polyethylene-based resin and a polypropylene-based resin.

Among these, a polypropylene-based resin is particularly preferable from the viewpoint of flexibility, dispersibility, and transparency.

Examples of the polyethylene-based resin include, but are not limited to, low density polyethylene (LDPE), high density polyethylene (HDPE), and linear low density polyethylene (LLDPE).

From the viewpoint of transparency, the polypropylene-based resin is preferably a propylene homopolymer and/or a block copolymer or random copolymer of propylene and a $C_{2-20}$ α-olefin other than propylene.

Only one of these may be used singly, and two or more may be used in combination.

Examples of the $C_{2-20}$ α-olefin other than propylene include, but are not limited to, ethylene, 1-butene, 1-hexene, 4-methyl-1-pentene, 1-octene, and 1-decene. A $C_{2-8}$ α-olefin is preferable, and ethylene, 1-butene, 1-hexene, and 4-methyl-1-pentene are more preferable.

Only one of the above $C_{2-20}$ α-olefins may be used singly, and two or more may be used in combination.

The $C_{2-20}$ α-olefin unit (except for propylene) contained in the polypropylene-based resin is preferably 0.3 to 10 mass % in the polypropylene-based resin, more preferably 0.3 to 7 mass %, and even more preferably 0.3 to 6 mass %.

An α-olefin unit content of 10 mass % or less in the polypropylene-based resin is likely to result in better blocking resistance, and a content of 0.3 mass % or more is likely to result in excellent flexibility and transparency.

The melt flow rate (ASTM D1238: 230° C., 2.16 kg load) of the polyolefin-based resin used in the present embodiment is preferably 5 to 20 (measurement unit: g/10 min).

From the viewpoint of processability, the melt flow rate is preferably 5.5 to 18 (g/10 min) and more preferably 8 to 16 (g/10 min).

A melt flow rate of the polyolefin-based resin of 20 (g/10 min) or less results in excellent processability and moldability. When the melt flow rate is 5 (g/10 min) or more, the melt viscosity difference relative to the hydrogenated block copolymer in the present embodiment is not large, and the compatibility with each other is enhanced.

The melt flow rate of the polyolefin-based resin can be controlled to the above numerical range by adjusting the molecular weight and the structure.

In the present embodiment, from the viewpoint of flexibility, dispersibility, mechanical properties, and transparency, the difference between the melt flow rate value of the polyolefin-based resin and the melt flow rate value of the hydrogenated block copolymer is preferably 5 to 15 g/10 min, more preferably 7 to 13 g/10 min, and even more preferably 9 to 11 g/10 min.

By controlling the difference between the melt flow rate value of the polyolefin-based resin and the melt flow rate value of the hydrogenated block copolymer to the above range, the dropping impact resistance of a film and the clamp resistance of a tube that are formed using the polyolefin-based resin composition of the present embodiment are enhanced.

The difference between the melt flow rate value of the polyolefin-based resin and the melt flow rate value of the hydrogenated block copolymer can be adjusted to the above numerical range by the method of selecting materials or by controlling polymerization conditions.

The melting point of the polyolefin-based resin used in the present embodiment is preferably 90° C. or higher and 160° C. or lower, more preferably 100° C. or higher and 155° C. or lower, and even more preferably 110° C. or higher and 150° C. or lower.

When the melting point of the polyolefin-based resin is 160° C. or lower, better crystallinity is likely to be ensured, and better flexibility is likely to be obtained.

When the melting point is 90° C. or higher, better heat resistance is likely to be ensured, and such a melting point is preferable from the viewpoint of preventing the stickiness and blocking of products and ensuring good handleability.

(Polyolefin-based Resin Composition)

The polyolefin-based resin composition of the present embodiment comprises the above-described hydrogenated block copolymer and polyolefin-based resin.

The mass ratio of the polyolefin-based resin/the hydrogenated block copolymer is 95 to 5 parts by mass/5 to 95 parts by mass.

Depending on the performance required in the intended application, the mass ratio of the polyolefin-based resin/the hydrogenated block copolymer is 95 to 5 parts by mass/5 to 95 parts by mass, preferably 90 to 10 parts by mass/10 to 90 parts by mass, and more preferably 80 to 20 parts by mass/20 to 80 parts by mass.

From the viewpoint of flexibility and heat sealability, the mass ratio of the polyolefin-based resin/the hydrogenated block copolymer is even more preferably 50 to 10 parts by mass/50 to 90 parts by mass.

When the polyolefin-based resin composition of the present embodiment is used as a film, the mass ratio of the polyolefin-based resin/the hydrogenated block copolymer is preferably 80 to 20 parts by mass/20 to 80 parts by mass, and preferably 78 to 25 parts by mass/22 to 75 parts by mass.

When it is used as a tube, the mass ratio is preferably 70 to 30 parts by mass/30 to 70 parts by mass, and preferably 65 to 35 parts by mass/35 to 65 parts by mass.

Furthermore, in the polyolefin-based resin composition of the present embodiment, the hydrogenated block copolymer content is preferably 5 to 95 mass %, more preferably 10 to 90 mass %, and even more preferably 20 to 80 mass %.

From the viewpoint of mechanical properties, the content is preferably 10 mass % or more and less than 60 mass %, and preferably 20 mass % or more and 50 mass % or less.

In the polyolefin-based resin composition of the present embodiment, the polyolefin-based resin content is preferably 5 to 95 mass %, more preferably 10 to 90 mass %, and even more preferably 20 to 80 mass %.

From the viewpoint of flexibility, the content is preferably more than 40 mass % and 90 mass % or less, and preferably 50 mass % or more and 80 mass % or less.

The melt flow rate value (ASTM D1238: 230° C., 2.16 kg load) of the polyolefin-based resin composition of the present embodiment is 7 to 26 (measurement unit: g/10 min).

It is preferably 8 to 21 (g/10 min) and more preferably 9 to 16 (g/10 min).

When the melt flow rate value of the polyolefin-based resin composition of the present embodiment is 7 (g/10 min) or more, effects of improving thin-wall molding processability and surface roughness are obtained, and when 26 (g/10 min) or less, effects on mechanical properties are obtained.

The melt flow rate of the polyolefin-based resin composition of the present embodiment can be controlled to the above numerical range by controlling the melt flow rate of the polyolefin-based resin, the melt flow rate of the hydrogenated block copolymer, and the blending ratio of the polyolefin-based resin to the hydrogenated block copolymer.

When the polyolefin-based resin composition of the present embodiment is formed into an extruded film by using a vented uniaxial extruder with a screw diameter of 40 mm set at a cylinder temperature of 200° C. and a T-die temperature of 200° C. while configuring the discharge rate at 5 kg/hr, the T-die slit thickness at 0.5 mm, the die slit width at 400 mm and the mill roll surface temperature at 45° C. and controlling the draw rate such that the thickness is 0.25 mm, it is preferable that the ratio of the elastic modulus in the MD direction to the elastic modulus in the TD direction of the film (MD/TD ratio) is 0.85 to 1.2.

Accordingly, effects of enhancing flexibility, dispersibility, and mechanical properties are obtained.

The ratio of the elastic modulus in the MD direction to the elastic modulus in the TD direction (MD/TD ratio) is preferably 0.9 to 1.18, and more preferably 1.0 to 1.16.

The ratio of the elastic modulus in the MD direction to the elastic modulus in the TD direction (MD/TD ratio) can be measured by the method described in the Examples below.

The MD/TD ratio can be adjusted by controlling, for example, the melt flow rate value of the hydrogenated block copolymer, the melt flow rate value of the polyolefin-based resin, and the difference between the melt flow rate value of the polyolefin-based resin and the melt flow rate value of the hydrogenated block copolymer, and can be adjusted to the above numerical range by setting the melt flow rate value of the hydrogenated block copolymer at 10 to 30 g/10 min, the melt flow rate value of the polyolefin-based resin at 5 to 20 g/10 min, and the difference between the melt flow rate value of the polyolefin-based resin and the melt flow rate value of the hydrogenated block copolymer at 5 to 15 g/10 min.

(Other Components)

As other components, various additives such as a filler, a heat stabilizer, a weathering stabilizer, a flame retardant, a hydrochloric acid absorbent, and a pigment can be blended with the polyolefin-based resin composition of the present embodiment as necessary.

[Production Method of Polyolefin-based Resin Composition]

Examples of the method for producing the polyolefin-based resin composition of the present embodiment include, but are not limited to, a dry-blending method and a method in which preparation is performed with a predetermined mixing device that is commonly subjected to the mixing of polymeric materials.

Examples of the mixing device include, but are not limited to, kneaders such as a Banbury mixer, a Labo Plastomill, a uniaxial extruder, and a biaxial extruder, and a melt mixing method with an extruder is preferable from the viewpoint of productivity and good kneading characteristics.

Although the melt temperature during kneading can be suitably set, it is usually within a range of 130 to 300° C. and preferably within a range of 150 to 250° C.

[Film]

The film of the present embodiment comprises the polyolefin-based resin composition of the present embodiment.

The film of the present embodiment can be formed into a desired shape by the method provided as an example below or the like.

That is to say, the production method of the film of the present embodiment is not particularly limited, and, for example, a T-die method, an inflation method or the like can be employed as an extrusion molding method, and commonly used air-cooled inflation molding, air-cooled two-stage inflation molding, high-speed inflation molding, water-cooled inflation molding or the like can be employed as inflation molding. Alternatively, blow molding methods such as direct blowing and injection blowing, and press molding methods can be employed as well.

As film molding methods, the above-described various molding methods are applicable, and among those methods, a T-die molding method and an inflation molding method are particularly preferable for the film of the present embodiment from the viewpoint of bubble stability and drawdown suppression.

By forming the polyolefin-based resin composition of the present embodiment into a sheet by these methods, the film of the present embodiment can be suitably obtained.

In general, what is referred to as a film has a thickness of 0.005 mm or more and less than 0.30 mm.

Although the thickness of the film of the present embodiment is not particularly limited, from the viewpoint of molding processability, flexibility, and the like, the thickness is preferably within a range of 0.005 mm to 0.25 mm and more preferably 0.01 mm to 0.20 mm.

[Medical Bag]

The medical bag of the present embodiment comprises the film of the present embodiment.

As for the film of the present embodiment, from the viewpoint of dropping impact resistance when the film is formed into a medical bag, the ratio of the elastic modulus in the MD direction to the elastic modulus in the TD direction (MD/TD ratio) is preferably 0.85 to 1.2, more preferably 0.9 to 1.18, and more preferably 1.0 to 1.16.

Here, the bag refers to a bag (a receptacle) for accommodating an infusion solution or the like as its contents. The bag may have a plug member in addition to a bag body for accommodating its contents. Moreover, the bag may have a hang hole for hanging the bag. In the bag, the film material that separates the inner part for accommodating an infusion solution from the outer part may have a multilayer structure.

The ratio of the elastic modulus in the MD direction to the elastic modulus in the TD direction (MD/TD ratio) can be measured by the method described in the Examples below.

The MD/TD ratio of the film can be adjusted by controlling, for example, the melt flow rate value of the hydrogenated block copolymer, the melt flow rate value of the polyolefin-based resin, and the difference between the melt flow rate value of the polyolefin-based resin and the melt flow rate value of the hydrogenated block copolymer, and the MD/TD ratio can be controlled to the above numerical range by setting the melt flow rate value of the hydrogenated block copolymer at 10 to 30 g/10 min, the melt flow rate value of the polyolefin-based resin at 5 to 20 g/10 min, and the difference between the melt flow rate value of the polyolefin-based resin and the melt flow rate value of the hydrogenated block copolymer at 5 to 15 g/10 min.

An increased hydrogenated block copolymer content is likely to result in an increased MD/TD ratio.

As demonstrated in the Examples below, the film of the present embodiment has an excellent balance of flexibility, thin-wall molding processability, dispersibility, mechanical properties, and transparency, and can be used without particular limitations to applications.

Owing to this feature, it can be suitably used in a broad range of applications such as packaging of various clothes, packaging of various food products, packaging of miscellaneous goods for daily use, packaging of industrial materials, laminate of various rubber products, resin products, leather products, and the like, elastic tape used for paper diaper and the like, industrial goods such as dicing film, protection film used for protecting construction materials and steel plates, a substrate of adhesive film, household electrical appliance applications such as television sets, stereos, and cleaners, automobile interior and exterior parts applications such as bumper parts, body panels, and side seals, articles for daily use, and medical tools such as medical bags.

Among these, owing to the good physical property balance of flexibility, thin-wall molding processability, dispersibility, mechanical properties, and transparency the film of the present embodiment can be suitably used as a medical-use shaped body, in particular a medical bag.

[Tube]

The tube of the present embodiment comprises the polyolefin-based resin composition of the present embodiment.

The tube of the present embodiment is formed into a desired shape by the method provided as an example below or the like.

That is to say, although the method for producing the tube of the present embodiment is not limited to the following, for example, a polyolefin-based resin composition obtained as described above is introduced into an extruder and melted, passed through a die to have a tubular shape, and water-cooled or air-cooled so that a tube, which is a shaped article, can be obtained.

The extruder to be used is not particularly limited, and, for example, a uniaxial or multiaxial extruder or the like is usable, and, also, a multilayer tube that has undergone multilayer extrusion using multiple extruders can be formed. Also, a tube can be directly formed from the extruder used during the production of the polyolefin-based resin composition.

The shape of the tube of the present embodiment obtained by the above method is not particularly limited, and, for example, the tube may have a circular, oval, or another cross-sectional shape.

Although the width of the tube is not particularly limited, for example, the outer diameter is preferably 1 to 50 mm, more preferably 2 to 30 mm, and even more preferably 3 to 20 mm.

The thickness of the tube is preferably 0.3 to 30 mm, more preferably 0.4 to 20 mm, and even more preferably 0.5 to 10 mm.

As for the tube of the present embodiment, from the viewpoint of clamp resistance, the ratio of the elastic modulus in the MD direction to the elastic modulus in the TD direction (MD/TD ratio) is preferably 0.8 to 1.2, more preferably 0.81 to 1.19, and more preferably 0.82 to 1.18.

The ratio of the elastic modulus in the MD direction to the elastic modulus in the TD direction (MD/TD ratio) of the tube can be measured by the method described in the Examples below.

The MD/TD ratio of the tube can be adjusted by controlling, for example, the melt flow rate value of the hydrogenated block copolymer, the melt flow rate value of the polyolefin-based resin, and the difference between the melt flow rate value of the polyolefin-based resin and the melt flow rate value of the hydrogenated block copolymer, and the MD/TD ratio of the tube can be controlled to the above numerical range by setting the melt flow rate value of the hydrogenated block copolymer at 10 to 30 g/10 min, the melt flow rate value of the polyolefin-based resin at 5 to 20 g/10 min, and the difference between the melt flow rate value of the polyolefin-based resin and the melt flow rate value of the hydrogenated block copolymer at 5 to 15 g/10 min.

Furthermore, the tube of the present embodiment may be formed into a multilayer tube by laminating another polymer as long as the object of the present embodiment is not impaired.

Such polymers include olefin polymers such as polypropylene, polyethylene, ethylene-propylene copolymer rubber (EPM), and ethylene-propylene-nonconjugated diene copolymer rubber (EPDM); polyester polymers such as polyester elastomer, polyethylene terephthalate, and polybutylene terephthalate; polyamide resins such as polyamide 6, polyamide 6,6, polyamide 6,10, polyamide 11, polyamide 12, and polyamide 6,12; acrylic resins such as polymethyl acrylate and polymethyl methacrylate; polyoxymethylene resins such as polyoxymethylene homopolymer and polyoxymethylene copolymer; styrene resins such as styrene homopolymer, acrylonitrile-styrene resin, and acrylonitrile-butadiene-styrene resin; polycarbonate resin; styrene elastomers such as styrene-butadiene copolymer rubber and styrene-isoprene copolymer rubber, and hydrogenation products or modification products thereof; natural rubber; synthetic isoprene rubber, liquid polyisoprene rubber, and hydrogenation products or modification products thereof; chloroprene rubber; acrylic rubber; butyl rubber; acrylonitrile-butadiene rubber; epichlorohydrin rubber; silicone rubber; fluororubber; chlorosulfonated polyethylene; polyurethane rubber; polyurethane elastomer; polyamide elastomer; and polyester elastomer; flexible vinylchloride resin.

One of the above polymers may be used singly, or two or more may be used in combination. Moreover, a single-layer structure or a multilayer structure in which the type of each layer may be different may be used.

The layer containing the aforementioned polymer in the tube having the multilayer structure may be any of the innermost layer, the intermediate layer, and the outermost layer depending on the desired performance to be imparted. The multilayer structure may be a part of the tube or may have multiple layers in an intermittent manner, or may be a multilayer structure containing different kinds of materials from portion to portion.

The tube of the present embodiment can also comprise a further component other than the polyolefin-based resin composition of the present embodiment, as long as the effect of the present embodiment is not impaired. Examples of the further component include, but are not limited to, any softening agents for rubber, modifiers, and additives.

[Molded Bodies]

The polyolefin-based resin composition of the present embodiment can be further utilized as, but are not particularly limited to, for example, injection-molded articles, hollow-molded articles, pressure-formed articles, vacuum-formed articles, extruded articles, and the like having various forms such as sheet.

Especially, a molded body containing a polypropylene-based resin composition, which is a preferable example of the polyolefin-based resin composition of the present embodiment, has an excellent balance of thin-wall tenacity, molding processability, flexibility, dispersibility, and transparency, and, furthermore, as a material also having excellent molding stability, processability, and adhesion, can be widely used for automobile-related matter, construction-related matter, various packaging materials, articles for daily use, and the like. In particular, it can be suitably used as a sheet, a film, a tube, a medical instrument material, a sanitary material, a material for non-woven fabric, a coating material of electric wires and/or cables, and a connector material.

EXAMPLES

Below, the present embodiment will now be specifically described by way of Examples, but the present embodiment is not limited to the Examples.

In the Examples and Comparative Examples, hydrogenated block copolymers were prepared, polyolefin-based resin compositions were produced, and physical properties were compared by the methods described below. At that time, the characteristics of the hydrogenated block copolymers, the characteristics of the polyolefin-based resins, and the physical properties of the polyolefin-based resin compositions were measured as follows.

[Measurement Methods]

(1) Measurement of Characteristics of Hydrogenated Block Copolymer

Measurement of total content of vinyl aromatic compound monomer unit (styrene content), sum of amount of 1,2-bond and amount of 3,4-bond before hydrogenation (amount of vinyl bond of conjugated diene), degree of hydrogenation of double bond based conjugated diene monomer unit (degree of hydrogenation of unsaturated bond), and content of polymer block B present at terminal (amount of terminal conjugated diene)

The styrene content, the amount of vinyl bond of a conjugated diene, and the degree of hydrogenation of double bond based on a conjugated diene compound were measured by nuclear magnetic resonance spectrum analysis (NMR). Using a JNM-LA400 (manufactured by JEOL, trade name) as a measuring instrument and deuterated chloroform as a solvent, measurement was performed at a sample concentration of 50 mg/mL, an observation frequency of 400 MHz, a pulse delay of 2.904 sec, a number of scans of 64, a pulse width of 45°, and a measurement temperature of 26° C., using TMS (tetramethylsilane) as a chemical shift reference.

As for the content of the polymer block B present at a terminal (the amount of a terminal conjugated diene), the value of the mass of a conjugated diene polymerized at a terminal was calculated from the total mass of monomers used in the polymerization reaction.

(2) Measurement of Polyolefin-based Resin

The α-olefin concentration (ethylene content) of a polyolefin-based resin was measured by nuclear magnetic resonance spectrum analysis (13C-NMR).

Using a JNM-LA400 (manufactured by JEOL, trade name) as a measuring instrument and ODCB (o-dichlorobenzene)/heavy benzene=4/1 (volume ratio) as a solvent, measurement was performed at a sample concentration of 100 mg/mL, an observation frequency of 400 MHz, a pulse delay of 15 sec, a number of scans of 5000, a pulse width of 90°, and a measurement temperature of 130° C., using TMS (tetramethylsilane) as a chemical shift reference.

(3) Measurement of Molecular Weight and Molecular Weight Distribution

The number average molecular weight and the weight average molecular weight of a hydrogenated block copolymer were determined as molecular weights in terms of polystyrene using commercially available standard polystyrene by GPC measurement (apparatus: LC-10 (manufactured by Shimadzu Corporation, trade name), columns: two TSKgel GMHXL columns (4.6 mm ID×30 cm), solvent: tetrahydrofuran). The molecular weight distribution was determined as a ratio of the weight average molecular weight to the number average molecular weight obtained.

(4) Melt Flow Rate Value (MFR)

The MFRs of a hydrogenated block copolymer, a polyolefin-based resin, and a polyolefin-based resin composition were measured in accordance with ASTM D1238 at a temperature of 230° C. at a load of 2.16 kg (measurement unit: g/10 min).

(5) Hardness (JIS-A)

As for the hardness (JIS-A) of a hydrogenated block copolymer, four pieces of a compression-molded sheet having a thickness of 2 mm were placed one on top of the other, and a momentary value was measured by a type A durometer in accordance with JIS K 6253.

(6) Transparency of Film

As for the transparency of a polyolefin-based resin composition, the haze of a 0.25 mm-thick film prepared by a film processor was measured using an "NDH-1001DP" (apparatus name) manufactured by Nippon Denshoku Industries Co., Ltd. The haze value serves as an indicator of transparency and dispersibility.

(7) Tensile Elastic Modulus and Tensile Strength

The tensile elastic modulus and the tensile strength of a polyolefin-based resin composition were measured by punching out a 0.25 mm-thick film prepared by a film processor into a JIS-5 test piece and performing measurement at a tensile rate of 200 mm/min in accordance with JIS K 7127.

The tensile elastic modulus serves as an indicator of flexibility, and a polyolefin-based resin composition having a tensile elastic modulus within a range of 100 to 600 was determined as a flexible material that can be suitably used.

The tensile strength serves as an indicator of mechanical properties, and a polyolefin-based resin composition having a tensile strength within a range of 20 to 40 was determined as a material having tensile strength that can be suitably used.

The tensile elastic moduli with respect to both the MD direction and the TD direction of this film were measured, and the ratio of the tensile elastic modulus in the MD direction to the tensile elastic modulus in the TD direction (MD/TD ratio) was calculated.

Here, the MD direction of the film is the direction in which the polyolefin-based resin composition is mechanically fed when a film is formed, and the TD direction is the direction perpendicular to the MD direction.

The tubes (an outer diameter of 4.0 mm, an inner diameter of 3.0 mm, a thickness of 0.5 mm) obtained in Examples 7 and 8 and Comparative Examples 6 and 7 described below were cut open in a lengthwise manner to provide strips of sheet (a thickness of 0.5 mm) and used as samples for tensile elastic modulus measurement, and measurement was performed at a tensile rate of 200 mm/min.

The tensile elastic moduli with respect to both the MD direction and the TD direction of the tubes were measured, and the ratio of the tensile elastic modulus in the MD direction to the tensile elastic modulus in the TD direction (MD/TD ratio) was calculated.

The MD direction of the tubes is the extruding direction during tube molding, and the TD direction is the direction perpendicular to the MD direction, and is the circumferential direction of the tubes.

(8) Evaluation of Thin-wall Molding Processability

As for the thin-wall molding processability of a polyolefin-based resin composition, a spiral flow test die having a cross-sectional width of 10 mm and thickness of 1 mm was attached to an injection molding machine (Toshiba FE-120S), the flowabilities of resins under the same conditions having a molding temperature of 210° C., a die temperature of 40° C., an injection pressure of 1200 kg/cm$^2$, an injection speed of 40%, and an injection time of 10 seconds were compared, and evaluations were made using the following evaluation criteria.

(Evaluation Criteria)

○: Flowability was high, the flow distance was 10 cm or more, and it also was possible to easily form a thin-wall shaped article X: Flowability was low, the flow distance was 10 cm or less, and it was difficult to form a thin-wall shaped article (9) Evaluation of Surface Roughness of Tube As for the surface roughness of tubes obtained from the polyolefin-based resin compositions of Examples 7 and 8 and Comparative Examples 6 and 7, tubular shaped bodies having an inner diameter of 4 mm and an outer diameter of 6 mm were prepared by extruding the polypropylene-based resin compositions (hydrogenated block copolymer/random PP resin=60/40) by a 20 mmφ biaxial extruder under the same conditions at 230° C. The surfaces thereof were visually compared, and evaluated using the following evaluation criteria. The surface roughness of a tube serves as an indicator of transparency.

(Evaluation Criteria: Surface Roughness)

○: Flowability was high, and it was possible to form a tube without creating surface irregularities x: Flowability was low, and it was difficult to form a tube because irregularities appear on the surface

(10) Transparency of Tube

The polypropylene-based resin compositions (hydrogenated block copolymer/random PP resin=60/40) of Examples 7 and 8 and Comparative Examples 6 and 7 were extruded by a 20 mmφ biaxial extruder at 230° C. to prepare tubular shaped bodies having an inner diameter of 4 mm and an outer diameter of 6 mm, and the resulting tubular shaped bodies were cut open to measure haze using "NDH-1001DP" (apparatus name) manufactured by Nippon Denshoku Industries Co., Ltd. A haze value serves as an indicator of dispersibility.

As an indicator of transparency, evaluations were made on a two-point scale of ○ and x in descending order of favorability.

Haze value of lower than 30%: transparency ○

Haze value of 30 or higher: transparency x

(11) Heat Sealability

Two pieces of each film having a thickness of about 250 μm obtained in Examples 1 to 6 and Comparative Examples 1 to 5 were placed one on top of the other, and then one surface was heated by a heat sealer (manufactured by Tester Sangyo Co., Ltd., TP-701-B: a sealing temperature of 150° C., a sealing time of 5 seconds, an actual pressure of 0.2 MPa).

The resulting samples were left to stand still at 23° C. for 24 hours or more, specimens having a width of 15 mm in the direction perpendicular to the seal width direction were cut out, and thus specimens having a 10 mm×15 mm sealed part were obtained.

Then, the sealed part of the specimens was peeled off at 180° at a rate of 200 mm/min by a tensile tester (Minebea Co., Ltd., TGE-500N) to measure heat seal strength over a width of 15 mm, which was regarded as an indicator of heat sealability.

(12) Clamp Resistance

The tubes obtained in Examples 7 and 8 and Comparative Examples 6 and 7 were used as evaluation samples, the tubes filled with distilled water were closed at 23° C. by a medical tube clamp (AS ONE Corporation, SPS-5019) for 5 hours, then the clamp was removed to measure the time until the inner shape of the tubes recovered and the fluid passed through, and the time was regarded as an indicator of the clamp resistance of the tubes.

(13) Dropping Impact Resistance

The films having a thickness of about 250 μm obtained in Examples 1 to 6 and Comparative Examples 1 to 5 were cut out to have 20 cm×13 cm, two pieces of each film was placed one on top of the other, one surface was heated to heat-seal three sides by a heat sealer (manufactured by Tester Sangyo Co., Ltd., TP-701-B: a sealing temperature of 150° C., a sealing time of 5 seconds, an actual pressure of 0.2 MPa).

The films, the three sides of which had been heat-sealed, were filled with 500 mL of water, then the remaining one side was heat-sealed, and thus test bags were obtained.

Next, the test bags were left to stand still for 12 hours in a 23° C. environment, and a falling weight test was performed from a height of 1.8 m such that the test bag surface was parallel to the floor surface.

The number of test bags were 5, and the proportion of bags that did not break after a weight was dropped 3 times was regarded as an indicator of dropping impact resistance, and evaluations were made on a two-point scale of ○ and x in descending order of favorability.

Proportion of unbroken of 80% or higher: Dropping impact resistance ○

Proportion of unbroken of lower than 80%: Dropping impact resistance x

[Raw Materials Used]

The hydrogenated block copolymers (A) and the polypropylene-based resins (PP) used in Examples and Comparative Examples were as follows.

<(A) Hydrogenated Block Copolymers>

(Preparation of Hydrogenation Catalyst)

The hydrogenation catalyst used in the hydrogenation reaction of the block copolymers was prepared by the following method. A nitrogen-purged reaction vessel was charged with 1 L of dried, purified cyclohexane, 100 mmol of bis(η5-cyclopentadienyl)titanium dichloride was added, an n-hexane solution containing 200 mmol of trimethylaluminium was added while performing sufficient stirring, a reaction was carried out at room temperature for about 3 days, and a hydrogenation catalyst was thus obtained.

(Preparation of Hydrogenated Block Copolymers)

<A-1>

Batch polymerization was carried out using a stirred jacketed tank reactor having an internal volume of 10 L.

First, 1 L of cyclohexane was introduced, then 0.100 parts by mass of n-butyllithium (hereinafter referred to as "Bu—Li") was added based on total 100 parts by mass of the monomers, 1.8 mol of N,N,N',N'-tetramethylethylenediamine (hereinafter referred to as "TMEDA") was added based on mol of Bn—Li, and 0.045 mol of sodium t-pentoxide (hereinafter referred to as "NaOAm") was added based on TEMDA.

As a first step, a cyclohexane solution containing 9 parts by mass of styrene (a concentration of 20 mass %) was introduced over 10 minutes, and then polymerization was carried out for 10 minutes. The temperature was controlled to 60° C. during the polymerization.

Next, as a second step, a cyclohexane solution containing 79 parts by mass of butadiene (a concentration of 20 mass %) was introduced over 100 minutes, and then polymerization was carried out for 10 minutes. The temperature was controlled to 60° C. during the polymerization.

Next, as a third step, a cyclohexane solution containing 9 parts by mass of styrene (a concentration of 20 mass %) was introduced over 10 minutes, and then polymerization was carried out for 10 minutes. The temperature was controlled to 60° C. during the polymerization.

Next, as a fourth step, a cyclohexane solution containing 3 parts by mass of butadiene (a concentration of 20 mass %) was introduced over 5 minutes, and then polymerization was carried out for 10 minutes. The temperature was controlled to 60° C. during the polymerization.

Next, the above hydrogenation catalyst was added to the resulting block copolymer in an amount of 100 ppm in terms of titanium based on 100 parts by mass of the block copolymer, and a hydrogenation reaction was carried out under a hydrogen pressure of 0.7 MPa at a temperature of 70° C. Thereafter, methanol was added, and then 0.3 parts by mass of octadecyl-3-(3,5-di-t-butyl-4-hydroxyphenyl)propionate was added as a stabilizer based on 100 parts by mass of the hydrogenated block copolymer.

The resulting hydrogenated block copolymer (A-1) had a styrene content of 18 mass %, an amount of vinyl bond of the butadiene block portion of 76 mol %, a weight average molecular weight of 116,000, a molecular weight distribution of 1.04, a degree of hydrogenation of 99 mol %, and an MFR of 15 (g/10 min).

The analysis results of the resulting hydrogenated block copolymer (A-1) are shown in Table 1.
<A-2>

A block copolymer having a three-part structure was produced such that Bu—Li was 0.110 parts by mass based on total 100 parts by mass of the monomers, the amount of butadiene in the second step was 82 parts by mass, and the fourth step was not performed. As for the other conditions, the same operation as in <A-1> above was performed, and a hydrogenated block copolymer (A-2) was thus produced.

The resulting hydrogenated block copolymer (A-2) had a styrene content of 18 mass %, an amount of vinyl bond of the butadiene block portion of 74 mol %, a weight average molecular weight of 97,000, a molecular weight distribution of 1.05, a degree of hydrogenation of 99 mol %, and an MFR of 20 (g/10 min).

The analysis results of the resulting hydrogenated block copolymer (A-2) are shown in Table 1.
<A-3>

Bu—Li was 0.060 parts by mass based on total 100 parts by mass of the monomers, the amount of styrene in the first and third step was 6.5 parts by mass, the amount of butadiene in the second step was 82 parts by mass, and the amount of butadiene in the fourth step was 5 parts by mass. As for the other conditions, the same operation as in <A-1> above was performed, and a hydrogenated block copolymer (A-3) was thus produced.

The resulting hydrogenated block copolymer (A-3) had a styrene content of 13 mass %, an amount of vinyl bond of the butadiene block portion of 77 mol %, a weight average molecular weight of 176,000, a molecular weight distribution of 1.06, a degree of hydrogenation of 98 mol %, and an MFR of 3.5 (g/10 min). The analysis results of the resulting hydrogenated block copolymer (A-3) are shown in Table 1.
<A-4>

A block copolymer having a three-part structure was produced such that Bu—Li was 0.094 parts by mass based on total 100 parts by mass of the monomers, TMEDA was 0.55 mol based on mol of Bu—Li, NaOAm was not added, the amount of butadiene in the second step was 82 parts by mass, and the fourth step was not performed. As for the other conditions, the same operation as in <A-1> above was performed, and a hydrogenated block copolymer (A-4) was thus produced.

The resulting hydrogenated block copolymer (A-4) had a styrene content of 18 mass %, an amount of vinyl bond of the butadiene block portion of 51 mol %, a weight average molecular weight of 111,000, a molecular weight distribution of 1.03, a degree of hydrogenation of 99 mol %, and an MFR of 4 (g/10 min). The analysis results of the resulting hydrogenated block copolymer (A-4) are shown in Table 1.

TABLE 1

|  |  | A-1 | A-2 | A-3 | A-4 |
|---|---|---|---|---|---|
| Styrene content | (wt %) | 18 | 18 | 13 | 18 |
| Amount of vinyl bond of conjugated diene | (mol %) | 76 | 74 | 77 | 51 |
| Amount of terminal conjugated diene | (wt %) | 3 | 0 | 5 | 0 |
| Weight average molecular weight | ×10000 | 11.6 | 9.7 | 17.6 | 11.1 |
| Degree of hydrogenation of unsaturated bond | (mol %) | 99 | 99 | 98 | 99 |
| MFR | (g/10 min) | 15 | 20 | 3.5 | 4 |
| Hardness (JIS A) | (JIS A) | 42 | 41 | 42 | 65 |

<(PP) Polypropylene-based Resins>

The analysis results of the following polypropylene-based resins are shown in Table 2.

PP-1 Ethylene-propylene random copolymer: Novatec MG3FQ (manufactured by Japan Polypropylene Corporation, MFR: 8 g/10 min, ethylene content: 2.5 wt %)

PP-2 Propylene homopolymer: Novatec MA3Q (manufactured by Japan Polypropylene Corporation, MFR: 10 g/10 min, ethylene content: 0 wt %))

PP-3 Propylene-ethylene block copolymer: Welnex RFG4VA (manufactured by Japan Polypropylene Corporation, MFR: 5 g/10 min, ethylene content: 5.5 wt %)

PP-4 Ethylene-propylene random copolymer: Novatec EG6D (manufactured by Japan Polypropylene Corporation, MFR: 1.9 g/10 min, ethylene content: 1.3 wt %)

PP-5 Propylene homopolymer: SunAllomer PM900A (manufactured by SunAllomer Ltd., MFR: 30 g/10 min, ethylene content: 0 wt %))

TABLE 2

|  |  | PP-1 | PP-2 | PP-3 | PP-4 | PP-5 |
|---|---|---|---|---|---|---|
| Kind |  | r-PP | h-PP | Metallocene PP | r-PP | h-PP |
| MFR | (g/10 min) | 8 | 10 | 5 | 1.9 | 30 |
| α-Olefin concentration (ethylene content) | (wt %) | 2.5 | 0 | 5.5 | 1.3 | 0 |

Examples 1 to 6 and Comparative Examples 1 to 5

The polyolefin-based resin compositions having the formulations shown in Table 3 (hydrogenated block copolymer/random PP resin=30/70) were formed into extruded films by using a vented uniaxial extruder with a screw diameter of 40 mm set at a cylinder temperature of 200° C. and a T-die temperature of 200° C. while configuring the discharge rate at 5 kg/hr, the T-die slit thickness at 0.5 mm, the die slit width at 400 mm and the mill roll surface temperature at 45° C. and controlling the draw rate such that the thickness was 0.25 mm.

The evaluation results of the resulting polypropylene-based resin composition films are shown in Table 3.

TABLE 3

|  |  | Example 1 | Example 2 | Example 3 | Example 4 | Comparative Example 1 | Comparative Example 2 | Example 5 | Example 6 | Comparative Example 3 | Comparative Example 4 | Comparative Example 5 |
|---|---|---|---|---|---|---|---|---|---|---|---|---|
| Hydrogenated block copolymer | A-1 | 30 | 40 | 60 | 0 | 0 | 0 | 30 | 30 | 30 | 0 | 0 |
|  | A-2 | 0 | 0 | 0 | 30 | 0 | 0 | 0 | 0 | 0 | 0 | 30 |
|  | A-3 | 0 | 0 | 0 | 0 | 30 | 0 | 0 | 0 | 0 | 0 | 0 |
|  | A-4 | 0 | 0 | 0 | 0 | 0 | 30 | 0 | 0 | 0 | 30 | 0 |
| Polyolefin-based resin | PP-1 | 70 | 60 | 40 | 70 | 70 | 70 | 0 | 0 | 0 | 0 | 0 |
|  | PP-2 | 0 | 0 | 0 | 0 | 0 | 0 | 70 | 0 | 0 | 0 | 0 |
|  | PF-3 | 0 | 0 | 0 | 0 | 0 | 0 | 0 | 70 | 0 | 0 | 0 |
|  | PF-4 | 0 | 0 | 0 | 0 | 0 | 0 | 0 | 0 | 70 | 70 | 0 |
|  | PP-5 | 0 | 0 | 0 | 0 | 0 | 0 | 0 | 0 | 0 | 0 | 70 |
| Transparency of film | Haze | 4.1 | 3.7 | 3.3 | 4.3 | 4 | 7.4 | 5.6 | 4.7 | 5.1 | 7.8 | 5.2 |
| Tensile elastic modulus | (MPa) | 470 | 320 | 120 | 490 | 300 | 900 | 590 | 340 | 770 | 1010 | 370 |
| Tensile strength | (MPa) | 34 | 31 | 23 | 36 | 30 | 53 | 38 | 42.7 | 46.6 | 61.8 | 9 |
| Heat-seal strength (150° C.) | (MPa) | 1.4 | 5.4 | 7.4 | 1.1 | 4.2 | 3.8 | 1.1 | 3.7 | 0.1 | 0.2 | 0.2 |
| Thin-wall molding processability |  | ○ | ○ | ○ | ○ | X | X | ○ | ○ | X | X | ○ |
| MFR | (g/10 min) | 9.7 | 10.3 | 11.7 | 15.2 | 6.2 | 6.5 | 11.3 | 7 | 3.5 | 2.4 | 26.6 |
| MD/TD ratio of tensile elastic moduli of film |  | 1.11 | 1.14 | 1.19 | 1.13 | 0.81 | 1.23 | 1.08 | 1.14 | 1.23 | 1.45 | 0.62 |
| Dropping impact resistance |  | ○ | ○ | ○ | ○ | ○ | X | ○ | ○ | X | X | X |

Examples 7 to 8 and Comparative Examples 6 to 7

The polypropylene-based resin compositions having the formulations shown in Table 4 (hydrogenated block copolymer/random PP resin=60/40) were extruded by a 20 mmφ biaxial extruder at 230° C. to prepare tubular shaped bodies having an inner diameter of 4 mm and an outer diameter of 6 mm.

The evaluation results of the resulting polypropylene-based resin composition tubes are shown in Table 4.

TABLE 4

|  |  | Example 7 | Example 8 | Comparative Example 6 | Comparative Example 7 |
|---|---|---|---|---|---|
| Hydrogenated block copolymer | A-1 | 60 | 0 | 0 | 0 |
|  | A-2 | 0 | 60 | 0 | 0 |
|  | A-3 | 0 | 0 | 60 | 0 |
|  | A-4 | 0 | 0 | 0 | 60 |
| Polyolefin-based resin | PP-1 | 40 | 40 | 40 | 40 |
| Surface roughness of tube |  | ○ | ○ | X | X |
| Transparency of tube | Haze | 27.9 | 28.2 | 34.9 | 36.1 |
|  |  | ○ | ○ | X | X |
| MFR | (g/10 min) | 11.7 | 13.9 | 4.9 | 5.3 |
| MD/TD ratio of tensile elastic moduli of tube |  | 11.9 | 1.18 | 0.83 | 1.61 |
| Clamp resistance of tube | (Second) | 153 | 182 | 171 | 300≤ |

INDUSTRIAL APPLICABILITY

The hydrogenated block copolymer and the polyolefin-based resin composition of the present invention have industrial applicability to various molded articles including automobile parts, civil engineering and construction applications, household electrical appliance parts, medical parts, sporting goods, miscellaneous goods and stationery, and to a broad range of other fields.

The invention claimed is:

1. A polyolefin-based resin composition comprising:
   a polyolefin-based resin, and
   a hydrogenated block copolymer having a polymer block A mainly comprising a vinyl aromatic monomer unit and a polymer block B mainly comprising a conjugated diene monomer unit, wherein
   a mass ratio of the polyolefin-based resin/the hydrogenated block copolymer is 95 to 5 parts by mass/5 to 95 parts by mass,
   a total vinyl aromatic monomer unit content in the hydrogenated block copolymer is 12 to 25 mass %,
   a degree of hydrogenation of double bonds based on the conjugated diene monomer unit in the hydrogenated block copolymer is 90 mol % or more, and a melt flow rate value is 7 to 26 g/10 min at 230° C. and 2.16 kg load, the hydrogenated block copolymer has a melt flow rate value of 10 to 30 g/10 min at 230 ° C. and 2.16 kg load, the polyolefin-based resin has a melt flow rate value of 5 to 20 g/10 min at 230° C. and 2.16 kg load, and a difference between the melt flow rate value of the polyolefin-based resin and the melt flow rate value of the hydrogenated block copolymer is 5 to 15 g/10 min.

2. The polyolefin-based resin composition according to claim 1, wherein a ratio of elastic modulus in an MD direction to elastic modulus in a TD direction (elastic modulus in MD direction/elastic modulus in TD direction) is 0.85 to 1.2 when the polyolefin-based resin composition is formed into a film having a thickness of 0.25 mm.

3. The polyolefin-based resin composition according to claim 1, wherein a mass ratio of the polyolefin-based resin to the hydrogenated block copolymer (the polyolefin-based resin/the hydrogenated block copolymer) is 50 to 10 parts by mass/50 to 90 parts by mass.

4. The polyolefin-based resin composition according to claim 1, wherein a sum of an amount of 1,2-bond and an amount of 3,4-bond before hydrogenation of the hydrogenated block copolymer is 65 to 90 mol %.

5. The polyolefin-based resin composition according to claim 1, wherein the hydrogenated block copolymer comprises at least two polymer blocks A and at least two polymer blocks B, at least one polymer block B is present at a terminal of the hydrogenated block copolymer, and a content of the polymer block B present at a terminal is 0.5 to 9 mass % of the hydrogenated block copolymer.

6. The polyolefin-based resin composition according to claim 1, wherein the polyolefin-based resin is a polypropylene-based resin.

7. The polyolefin-based resin composition according to claim 6, wherein the polypropylene-based resin is a propylene homopolymer and/or a block copolymer or random copolymer of propylene and a $C_{2-20}$ α-olefin (except for propylene).

8. The polyolefin-based resin composition according to claim 6, wherein the polypropylene-based resin is a block copolymer or random copolymer of propylene and a $C_{2-20}$α-olefin (except for propylene), and a content of the $C_{2-20}$ α-olefin (except for propylene) contained in the polyolefin-based resin is 0.3 to 10 mass % of the polyolefin-based resin.

9. A film comprising the polyolefin-based resin composition according to claim 1.

10. The film according to claim 9, wherein a ratio of elastic modulus in an MD direction to elastic modulus in a TD direction (elastic modulus in MD direction/elastic modulus in TD direction) is 0.85 to 1.2.

11. A medical bag comprising the film according to claim 9.

12. A tube comprising the polyolefin-based resin composition according to claim 1.

13. A medical bag comprising the film according to claim 10.

* * * * *